__United States Patent__ [19]

Leupold et al.

[11] 3,922,294

[45] Nov. 25, 1975

[54] PROCESS FOR THE MANUFACTURE OF ISOPROPYL ESTERS BY THE REACTION OF PROPYLENE WITH CARBOXYLIC ACIDS

[75] Inventors: Ernst Ingo Leupold, Hofheim, Taunus; Hans-Jürgen Arpe, Fischbach, Taunus, both of Germany

[73] Assignee: Hoechst Aktiengesellschaft, Frankfurt am Main, Germany

[22] Filed: Feb. 7, 1974

[21] Appl. No.: 440,580

[30] Foreign Application Priority Data
Nov. 24, 1973 Germany............................. 2358625
Feb. 10, 1973 Germany............................. 2306586

[52] U.S. Cl.... 260/410.9 R; 260/476 R; 260/468 R; 260/485 R; 260/486 R; 260/487; 260/497 R
[51] Int. Cl.² .......................................... C07C 67/04

[58] Field of Search ..... 260/410.9 R, 497 R, 485 R, 260/476 R, 487 R, 486 R

[56] References Cited
UNITED STATES PATENTS

| | | | |
|---|---|---|---|
| 2,021,851 | 11/1935 | Coleman | 260/497 R |
| 2,678,332 | 5/1954 | Cottle | 260/475 |
| 3,037,052 | 5/1962 | Bortnick | 260/485 |

Primary Examiner—Paul M. Coughlan, Jr.
Assistant Examiner—Diance G. Rivers
Attorney, Agent, or Firm—Curtis, Morris & Safford

[57] ABSTRACT

Isopropyl esters of carboxylic acids having up to 20 carbon atoms are prepared by passing propylene and the respective carboxylic acid continuously in parallel flow over an acid ion exchanger of the sulfonic acid type. The service life of the catalyst is greatly improved by adding a small amount of a strong mineral acid.

5 Claims, No Drawings

PROCESS FOR THE MANUFACTURE OF ISOPROPYL ESTERS BY THE REACTION OF PROPYLENE WITH CARBOXYLIC ACIDS

The present invention relates to a process for the continuous manufacture of isopropyl esters by addition of carboxylic acids on propylene.

It is known that propylene forms isopropyl esters with carboxylic acids in the presence of acid catalysts, for example sulfuric acid or phosphoric acid, in liquid phase. The mineral acids should be present in the reaction zone in a high concentration. For the manufacture of isopropyl acetate from acetic acid and propylene it has been proposed to use 40 to 50 % of sulfuric acid of 80 to 85 % strength.

This high proportion of a highly concentrated but still water-containing mineral acid has a number of disadvantages which detrimentally affect an industrial use.

High concentration of mineral acid causes partial polymerization of the propylene, which means propylene losses and forms by-products which are difficult to remove from the catalyst solution. Hence, especially in continuous operation expensive measures are required to maintain the activity of the catalyst solution. Moreover, the use of strong mineral acids in high concentration involves serious corrosion problems which complicate an industrial process.

A further serious drawback of the use of a water containing mineral acid as catalyst is the formation of by-products such as isopropanol and diisopropyl ether. Besides these losses in yield an azeotrope may form, for example of isopropanol and isopropyl acetate, which causes isolation problems.

The disadvantages are similar with the known manufacture of the esters in the gaseous phase using as catalysts carrier materials impregnated with mineral acids, for example phosphoric acid or polyphosphoric acid. In this process a slow but constant entrainment of the mineral acid can hardly be avoided. This insolves likewise the problems of a reduction in activity, of corrosion and of separation of the aggressive acid from the reaction mixture.

The present invention provides a process for the manufacture of isopropyl esters by reacting propylene with carboxylic acids, which comprises passing gaseous propylene and an aliphatic, cycloaliphatic, or aromatic carboxylic acid having up to 20 carbon atoms, either in liquid form or in the form of a solution in an inert solvent, in parallel flow continuously over an acid ion exchanger of the sulfonic acid type as catalyst, at a temperature in the range of from 40° to 170°C.

As compared with the known processes, the process of the invention combines several advantages. Under the reaction conditions the activity of the acid ion exchanger is almost unaltered even after 1,000 hours and a concentration or deposit of propylene polymers is not observed. Owing to the use of an insoluble catalyst corrosion problems do not arise.

An essential feature of the process of the invention is that it is carried out in a trickling phase. The liquid film around the catalyst particles necessary for an optimum utilization of the ion exchanger arranged in a fixed bed forms especially easily when propylene and carboxylic acid or carboxylic acid solution are passed over the catalyst bed in parallel flow, i.e., both reactants are passed over the catalyst in the same direction.

The uniform and complete wetting of the particles of the ion exchanger, the diameter of which is in the range of from 0.1 mm and a few millimeters, obtained in this manner results in high space time yields.

On the whole, the process of the invention is simple and very economical because of the high activity and selectivity and the long service life of the catalyst.

Suitable carboxylic acids are all aliphatic, cycloaliphatic and aromatic carboxylic acids having up to 20 carbon atoms, for example formic acid, acetic acid, propionic acid, isobutyric acid, 2-ethyl-hexanoic acid, 3,5,5-trimethyl-hexanoic acid, stearic acid, cyclohexane-carboxylic acid, benzoic acid, as well as unsaturated acids or acids containing hetero atoms, for example acrylic acid, methacrylic acid, crotonic acid, sorbic acid, oleic acid; chloroacetic acid, trichloroacetic acid. Di- and tricarboxylic acids can also be used, for example oxalic acid, malonic acid, succinic acid, maleic acid, fumaric acid, acetylene-dicarboxylic acid, aconitic acid. In the latter case, one or several carboxylic groups can be esterified, depending on the reaction conditions. With short residence times, the monoesters are mainly obtained, whereas long residence times lead to complete esterification.

When the carboxylic acid used in the process of the invention is not liquid at the reaction temperature, it is dissolved in a solvent which is inert towards the reaction components under the reaction conditions, such as cyclohexane, dioxane or tetrahydrofurane. It is more advantageous, however, to use as solvent the isopropyl ester of the carboxylic acid used, i.e., the reaction product. If a solvent other than the isopropyl ester of the carboxylic acid is used, it should have a boiling point above that of the reaction product.

The propylene can be used in pure form or diluted with an inert gas. It may contain, for example, nitrogen and noble gases or lower saturated hydrocarbons such as methane, ethane, propane or butane, or other gases.

The reaction is carried out at a temperature in the range of from 40° to 170°C, preferably 80° to 130°C. When the reaction mixture boils within that temperature range under normal pressure, boiling can be avoided by increasing the pressure. In this manner the formation of a liquid phase in the reaction zone is ensured, warranting a complete wetting of the catalyst.

As catalyst all strongly acid ion exchangers can be used, preferably macroporous polystyrene resins with $SO_3H$ functions as they are commercially available, for example, under the following names: Lewatit S 100, Lewatit SPC 118/H, Amberlyst 15, Amberlite XE-100.

To carry out the process of the invention gaseous propylene, either in the pure state or diluted with inert gases, and the liquid or dissolved carboxylic acid are passed in parallel flow, generally in downward direction, through a vertical reaction tube containing the catalyst. The reaction can be carried out at atmospheric pressure or under elevated pressure. To obtain a higher propylene conversion the application of pressure of up to 100 kg/cm² is expedient, higher pressures being likewise possible.

The molar proportion of propylene to carboxylic acid may vary within wide limits, preferably it is in the range of from 0.05 to 50.

It has been found that the service life of the catalyst, i.e., the duration of its catalytic efficiency can be considerably improved when the reaction of propylene with the carboxylic acid is carried out in the presence of a catalytic amount of a strong acid, for example a mineral acid.

It is known to use a mineral acid to regenerate an acid ion exchanger when cations are to be exchanged which block the catalytically active acid groups of the ion exchanger.

It is surprising that in the present reaction of propylene with carboxylic acids, which are not contaminated by cations, strong mineral acids have a stabilizing effect on the service life of the ion exchanger.

The influence of a strong acid on the service life of the catalyst is especially pronounced when isopropyl esters of unsaturated acids, for example acrylic acid or methacrylic acid which tend to oligomerization, are prepared.

In the esterification of a saturated carboxylic acid a reduction in the activity of the catalyst, which may be caused by a minor polymerization of the propylene, can also be avoided by the addition of a strong acid.

Hence, the process of the invention is preferably carried out in the presence of from 0.05 to 3% by weight, calculated on the weight of the carboxylic acid, of a strong acid having a $P_k$ value smaller than 4.

Suitable strong acids are, for example, $H_2SO_4$, $H_3PO_4$, HCl, $HClO_4$, or p-toluene-sulfonic acid. Especially good results are obtained with $H_2SO_4$.

The strong acid can be added separately from the carboxylic acid, either in diluted or in nondiluted form, or it can be added as a solution in the carboxylic acid. When the process is operated in recycle fashion only the losses of strong acid need be replenished.

The isopropyl ester is preferably separated continuously. After having left the reactor, unreacted propylene is separated from the liquid mixture consisting of carboxylic acid, the isopropyl ester thereof and a solvent, if any, and recycled into the reactor. The liquid components are continuously subjected to fractional distillation, optionally under reduced pressure, expediently with utilisation of the reaction heat without cooling. From the boiler of the distilling column the unreacted carboxylic acid, the solvent possibly used and isopropyl ester which has not been separated completely are continuously recycled into the reactor. Pure isopropyl ester is withdrawn at the head of the column.

Isopropyl esters are used to a large extent as solvents. They are much more resistant to hydrolysis than n-alkyl esters. Furthermore, they constitute industrially interesting intermediates for condensation and addition reactions.

The following examples illustrate the invention. The propylene was measured under normal conditions of pressure and temperature i.e., 760 mm Hg and 20°C.

EXAMPLES 1 to 10

A vertical glass reactor having a length of 86 cm was fed from above over a dosing pump with 0.6 to 0.8 kg/hr of carboxylic acid as defined in the following table and heated to 90°C while adding 140 l/hr of propylene. The reactor contained 0.55 l of a cation exchanger (Amberlyst 15, H-form) and was heated to 95°–100°C. Under the said conditions the catalyst was completely wetted. The excess propylene was recycled. The liquid portion of the reaction mixture passed, without cooling, into the boiler of a distilling column. The boiler temperature corresponded to the reaction temperature. The isopropyl ester was withdrawn at the head of the column under reduced pressure. From the boiler a mixture containing a small amount of isopropyl ester and the unreacted acid was continuously recycled into the reactor. The space-time-yields of the isopropyl esters obtained are indicated in the table. In all cases the selectivity was over 99%.

| Example | carboxylic acid | % by weight ester in reaction mixture | space-time-yield g/l.hr |
|---|---|---|---|
| 1 | formic acid | 10 | 150 |
| 2 | acetic acid | 27 | 450 |
| 3 | chloroacetic acid | 83 | 1300 |
| 4 | trichloroacetic acid | 97 | 1600 |
| 5 | acrylic acid | 42 | 1100 |
| 6 | methacrylic acid | 47 | 1200 |
| 7 | isobutyric acid | 44 | 620 |
| 8 | benzoic acid (33% solution in dioxane) | 25 (after removal of dioxane) | 150 |
| 9 | 3,5,5-trimethyl-hexanoic acid (90%) | 36 | 410 |
| 10 | stearic acid | 28 | 400 |

EXAMPLE 11

The apparatus described in Example 1 was fed in dosed quantities with 1.0 kg/hr of acetic acid and 150 l/hr of propylene (92% strength). With a regulating valve at the end of the reactor an overpressure of 1.0 kg/cm² was adjusted. The inner temperature of the reactor was 85° to 90°C. The yield, calculated on unreacted acetic acid, i.e., the selectivity, was above 99.5%, the space-time-yield amounted to 520 g/l.hr of isopropyl acetate. After an operating period of 1,000 hours a yield of almost 500 g/l.hr was still obtained.

EXAMPLE 12

The essential parts of the apparatus were the same as in Example 1. The reactor was made of stainless steel and contained 0.95 l of Lewatit SPC 118 (H-form). The pressure in the reactor amounted to 63 kg/cm², the temperature was 98° to 103°C. The reactor was fed in dosed quantities with 2.3 kg/hr of acetic acid and 350 l/hr of propylene (92% strength). With a propylene conversion of over 90%, the yield of isopropyl acetate was 1,390 g/hr.

EXAMPLE 13

0.49 kg/hr of acetic acid and 40 l/hr of propylene were metered into the apparatus described in Example 1. The temperature in the reactor was 90°C. With a propylene conversion of 90.5% the space-time-yield of isopropyl acetate was 310 g/l.hr. Calculated on reacted acetic acid and on reacted propylene, the yield was above 99.5% in either case.

EXAMPLE 14 (COMPARATIVE EXAMPLE)

A vertical reactor of V 4 A steel having a length of 100 cm and containing 250 ml of a polystyrene divinyl benzene resin with sulfonic acid groups (Lewatit SPC 118) was continuously fed with 50 l/hr of propylene and 250 g/hr of acrylic acid. The reactor was heated to 60°. In the liquid reaction mixture consisting essentially of unreacted acrylic acid and isopropyl acrylate the content of isopropyl acrylate was analyzed and the following values were found:

| time of reaction (hours) | 100 | 200 | 300 | 400 | 500 |
|---|---|---|---|---|---|
| isopropyl acrylate | 25 | 12 | 10 | 9 | 9 |

-continued (% by weight)

EXAMPLES 15 AND 16

The reaction conditions were the same as in Example 14, with the exception that a strong acid was added to the acrylic acid. In Example 15 the acrylic acid contained 1% by weight of $H_2SO_4$

| time of reaction (hours) | 100 | 200 | 300 | 400 | 500 |
|---|---|---|---|---|---|
| isopropyl acrylate (% by weight) | 25 | 25 | 24 | 25 | 24 |

In Example 16 the acrylic acid used contained 0.5% by weight of HCl

| time of reaction (hours) | 100 | 200 | 300 | 400 | 500 |
|---|---|---|---|---|---|
| isopropyl acrylate (% by weight) | 25 | 23 | 24 | 24 | 24 |

What is claimed is:

1. A process for the manufacture of isopropyl esters by reacting propylene with carboxylic acids, in trickling phase, which comprises the step of passing gaseous propylene and an aliphatic, cycloaliphatic, or aromatic carboxylic acid having up to 20 carbon atoms either in liquid form or in the form of a solution in an inert solvent continuously in parallel flow over an acid ion exchanger of the sulfonic acid type at a temperature in the range of from 40° to 170°C.

2. The process of claim 1, wherein a solution of the carboxylic acid in its isopropyl ester is reacted.

3. The process of claim 1, wherein the isopropyl ester is continuously distilled off from the liquid reaction mixture and the remaining mixture is recycled into the reaction.

4. The process of claim 1, wherein the reaction is carried out in the presence of 0.05 to 3% by weight, calculated on the weight of the carboxylic acid, of a strong acid having a $P_k$ value of less than 4, and wherein said strong acid is $H_2SO_4$, $H_3PO_4$, HCl, $HClO_4$ or p-toluene sulfonic acid.

5. The process of claim 4, wherein sulfuric acid is added to the carboxylic acid.

* * * * *